United States Patent Office 2,869,702
Patented Jan. 20, 1959

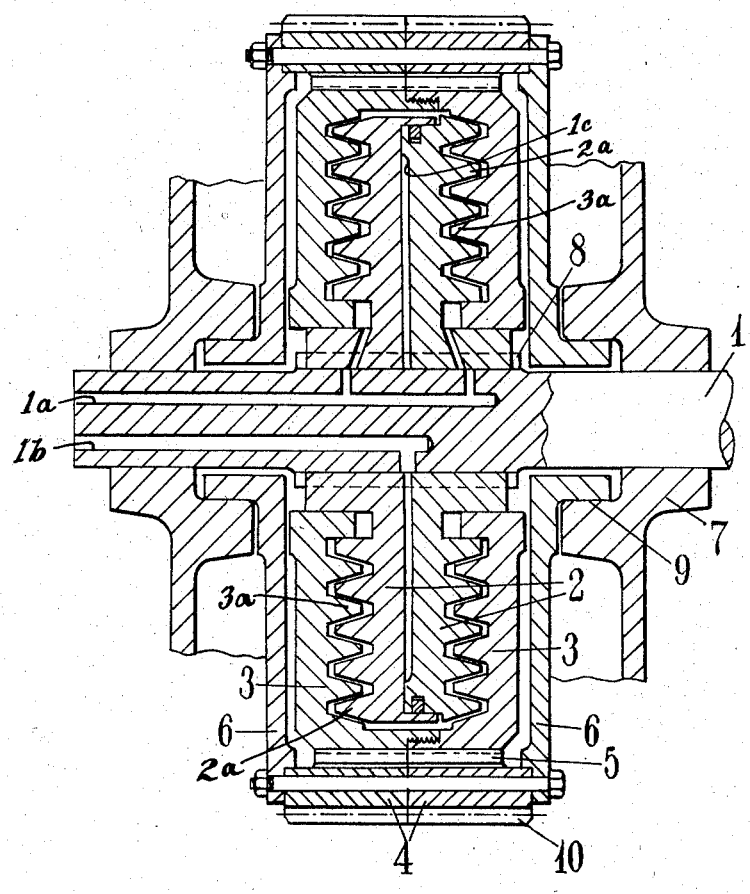

2,869,702

FLUID PRESSURE OPERATED FRICTION CLUTCH

Thomas Hindmarch, Chesham, England

Application December 5, 1955, Serial No. 551,139

Claims priority, application Great Britain December 8, 1954

3 Claims. (Cl. 192—85)

This invention relates to fluid pressure operated friction clutches, and in particular to such clutches incorporating a toothed pinion, and relates more specifically to fluid pressure operated friction clutches of the kind having a pair of disc-like movable clutch members mounted back to back axial with and for rotation with a shaft and positioned within a circular hollow member axial with and freely rotatable in respect of said shaft, engagement of said clutch being effected by the introduction of fluid under pressure between said disc-like members, whereby they are urged apart and so contact the inner surfaces of said hollow member by means of V-grooved surfaces upon each.

The circular hollow or outer clutch member has on its outer circumference a gear ring or alternatively it has gear teeth cut directly on its outer periphery, so that, a drive between the shaft and another toothed wheel, drivingly engaging the said outer clutch member, may be completed or interrupted as required by the fluid pressure operated clutch.

The form of construction has been widely used, but in the case of very large sizes an undesirable condition arises because the clearances necessary for the satisfactory operation of the clutch tend to introduce too large a tolerance for the most efficient operation of the gear teeth. This undesirable clearance arises in the following way. The outer member rotates on the shoulders of a boss on each of the inner members, which inner members in turn are connected to the shaft by means of splines on which they slide. Working clearances at the splines as between the shaft and the inner member are essential and in addition further working clearances must be provided between the inner and outer members at the bosses as described. The sum of these clearances, when transmitted to the outer circumference of the outer member, which is, in fact, the gear ring of the pinion, may prove to be excessive for the most silent and efficient operation of the gear. In addition, there is a further feature which may mitigate against absolute concentricity and that is, that the inner members when pressed into engagement with the outer member tend to take over control of the outer member so far as its axis of rotation is concerned. These three influences may severally or collectively cause the gear ring to rotate in an untrue path.

It will therefore be seen that a fluid pressure operated friction clutch construction as described has, firstly, as a pinion, to mesh with the greatest accuracy with its engaging pinion while secondly, it has to conform to the centre of rotation imposed upon it by the movable clutch members. The first of these requirements necessitates the narrowest possible tolerances in construction, while the second requirement calls for the widest practical tolerances in order that the inner movable clutch members have free movement. A compromise between these two opposing conditions is unsatisfactory in large size pinions and therefore the object of the present invention is to provide a construction free from these disadvantages.

The invention consists in a fluid pressure operated friction clutch or set of clutches of the kind having one or more disc-like movable clutch members mounted upon a shaft for rotation therewith and positioned within a hollow member which is freely rotatable in respect to said shaft, engagement of the said clutch or clutches being effected by fluid under pressure to move the movable member or members longitudinally of said shaft to contact the inner surface or surfaces of said hollow member by a friction surface upon each, characterised in that the said clutch or clutches are mounted within and substantially coaxial of an outer cylindrical drum-like member which is provided with teeth upon its outer periphery, and which is mounted in journals upon the casing, the drive between the hollow member and the drum-like member being by way of directly engaging non-resilient abutment surfaces upon each, and affording relative radial and/or axial movement therewith. By this means it can be seen that the drum-like member runs independently of the clearances given to the clutch members. Furthermore, the two conflicting requirements above referred to are reconciled in that the clutch members are permitted to move with such freedom as they require while the outer drum-like member is accurately centered and operates in its predetermined path independently of the clutches. Any movement between the drum and the clutch is catered for by the abutment members therebetween.

The accompanying drawing shows, by way of example only, an embodiment of the invention in which the figure is a longitudinal section through a clutch in which the outer drum-like member runs in bearings on the casing.

Referring to the figure, the shaft 1 with oil passages 1a and 1b drilled therein is provided with splines 8 and carries the inner clutch members 2, 2, which are movable longitudinally of the shaft 1 to engage the clutch by the introduction of pressure fluid to the space 1c between the said inner members, so that said inner members engage the friction surfaces of the outer member 3. The friction surfaces are denoted 2a and 3a, respectively. The outer drum-like member comprises an outer ring member 4 bolted between the end plates 6, 6, the inner periphery of the ring member being provided with splines which engage the splines 5 provided on the outer periphery on the outer clutch member 3. By this means the outer clutch members may move relatively to the drum-like member as the coupling rotates. The drum-like member is mounted on large journals 9 located in the bosses 7 which are part of the external casing and this can be arranged to run truly with little clearance. The outer periphery of the outer drum member is provided with teeth 10 with which another toothed wheel is engaged.

It will be observed that the gear teeth of the drum member are controlled in their rotation by the accurate journal bearings on the casing and are free from any errors or irregularities arising from the clutch.

It is to be understood that the above description is by way of example only and that details for carrying the invention into effect may be varied without departing from the scope of the invention.

I claim:

1. In a fluid pressure operated friction clutch device, a shaft, at least one disc-like axially movable clutch member mounted upon the shaft for rotation therewith, a hollow member freely rotatable on said shaft surrounding said clutch member, complemental interengaging faces on said members, means to introduce fluid under pressure within said hollow member for moving said movable member longitudinally of said shaft to interengage the faces of the said members, an outer cylindrical drum-like member enclosing said movable and hollow members, a fixed casing, means journalling the drum-like member to the casing coaxially of the shaft and for free rotation relative to the shaft and drive means between said hollow member and said drum-like member comprising abutments on said hollow member and said drum like member.

2. The device as claimed in claim 1, in which the drum-like member has external gear teeth and functions as a pinion in mesh with at least one other pinion.

3. The device as claimed in claim 1, in which there are substantial clearances between the said clutch member, hollow member and said drum-like member affording relative radial, and axial movement therebetween.

References Cited in the file of this patent

UNITED STATES PATENTS

| | | |
|---|---|---|
| 1,879,633 | Olsen | Sept. 27, 1932 |
| 2,389,961 | Dodge | Nov. 27, 1945 |
| 2,747,711 | Schmitter | May 29, 1956 |

FOREIGN PATENTS

| | | |
|---|---|---|
| 607,940 | Great Britain | Sept. 7, 1948 |
| 694,456 | Great Britain | July 22, 1953 |
| 695,987 | Great Britain | Aug. 19, 1953 |